May 19, 1964 A. SHULMAN ETAL 3,134,045

COMBINED PICTURE WIDTH AND HIGH VOLTAGE CONTROL CIRCUIT FOR TELEVISION RECEIVER

Filed Dec. 1, 1960

INVENTORS
ABE SHULMAN AND
ARMIEN L. VOGT by Mason, Kolehmainen, Rathburn and Wyss
ATTORNEYS.

3,134,045

COMBINED PICTURE WIDTH AND HIGH VOLTAGE CONTROL CIRCUIT FOR TELEVISION RECEIVER

Abe Shulman, Chicago, and Armien L. Vogt, Elmhurst, Ill., assignors to Wells-Gardner Electronics Corporation, Chicago, Ill., a corporation of Illinois Filed Dec. 1, 1960, Ser. No. 72,951
7 Claims. (Cl. 315—27)

The present invention relates to television receivers, and, more particularly, to a control circuit for simultaneously controlling both the width of the television picture and the high voltage which is developed for the anode of the picture tube.

In certain arrangements heretofore proposed the width of the television picture has been controlled by employing a variable impedance which is connected in series with the horizontal scanning coils or, in the alternative, is connected across a portion of the secondary winding of the horizontal output transformer. In those instances where a variable inductance has been employed in series with or connected across the deflection coils, a relatively expensive device is required having a movable core, coil form and the necessary coils which must withstand relatively high transient voltages. In the other arrangements wherein a potentiometer is connected across a portion of the secondary, this potentiometer functions to shunt a portion of the deflection current so as to vary the peak amplitude of the current flowing in the deflection coils and hence the width of the picture. Such a potentiometer is expensive since it must dissipate a large amount of power and have a relatively low resistance. Also, when such a potentiometer is employed the turns ratios between the windings of the horizontal output transformer are affected by variation of this potentiometer in such manner that a large change is produced in the high voltage which is developed by the high voltage rectifier circuit connected to the customary tertiary winding of the horizontal output transformer. This large change in high voltage is sufficient to substantially nullify the desired change in picture width. Thus, as the potentiometer shunts more current away from the deflection coil, which tends to produce a smaller picture by decreasing the maximum current in the deflection coils, the high voltage for the picture tube anode is also decreased so that the electron beam is accelerated by a lesser amount and is more easily deflected so that even with a smaller deflection current the same beam deflection is obtained and the width of the picture remains substantially unchanged.

While it is not desirable to produce such large variations in the high voltage for the picture tube anode in conjunction with changes in the picture width, neither is it desirable to maintain the high voltage substantially constant as the picture width is changed, a result which is achieved in certain other prior art arrangements. This is because with the variation in line voltage supplied to the television receiver and with variation in the maximum current capabilities of various horizontal power output tubes, conditions may be set up whereby the high voltage is so large in amplitude as to exceed the manufacture's ratings for the picture tube and substantially shorten the life of the various high voltage components associated with the picture tube.

A further disadvantage present in these prior art arrangements is that in most, if not all, of these arrangements the adjustment in the picture width produced such a change in the loading on the horizontal output tube that drive requirements for the output tube are altered. This means that the size and shape of the driving signal which is applied to the input circuit of the horizontal output tube must also be altered when the picture width is changed, a condition which is necessarily tedious and undesirable.

It is, therefore, an object of the present invention to eliminate one or more of the above discussed disadvantages of the prior art arrangements.

It is another object of the invention to provide a new and improved control circuit for a television receiver which is effective to vary the television picture width while at the same time producing a corresponding but proportional change in the high voltage produced for the accelerating anode of the picture tube.

It is further an object of the present invention to provide a new and improved picture width control circuit for a television receiver wherein a variable resistance device is employed to produce a proportional resistive loading effect on all of the windings of the horizontal output transformer so as to produce proportional changes in both picture width and high voltage upon adjustment of the variable resistance device.

It is a still further object of the present invention to provide a new and improved picture width control circuit for a television receiver wherein changes in the picture width are accompanied by corresponding changes in the high voltage so as to accommodate wide variations in line voltage and current capabilities of the horizontal power output tube without exceeding the high voltage specifications of the picture tube.

Another object of the present invention resides in the provision of a new and improved variable resistance device which is of extremely low resistance and is capable of high power dissipation and may be employed in a picture width control circuit to provide changes in picture width in a simple, reliable and economical manner.

A still further object of the present invention resides in the provision of a new and improved picture width control circuit for television receiver which employs a variable resistance device of high wattage dissipation which is of simple and economical construction and may be readily adjusted to produce proportional changes in both picture width and high voltage.

A still further object of the present invention resides in the provision of a new and improved picture width control circuit wherein variations in the picture width can be made without changing the drive requirements on the horizontal power output tube.

Briefly, in accordance with one aspect of the present invention, a separate winding preferably in the form of a single turn coil is provided on the core of the horizontal output transformer and a variable resistance device is connected across this single turn coil. This variable resistance device is arranged to have an extremely low resistance, in the order of a fraction of an ohm, which is adjustable in magnitude. The single turn coil thus acts as a shorted turn coil and produces a resistive loading effect on all of the transformer winding sections of the horizontal output transformer. Furthermore, this resistive loading effect on the windings of the transformer may be varied without changing the turns ratio between windings to that the drive requirements of the horizontal output tubes are not changed as the variable resistance device is adjusted. As the resistance of the variable resistance device is lowered an increasing resistive loading effect is produced on all of the windings of the transformer with the result that the maximum current flowing in the horizontal deflection coils is decreased so that the width of the picture also decreases correspondingly. At the same time, the resistive loading effect produced on the tertiary winding employed to supply high voltage causes a corresponding proportional reduction in the high voltage developed by the high voltage rectifier circuit so that the high voltage also decreases. However, the high voltage does not decrease by an amount sufficient to nullify the change in picture width so that both the picture width and the high voltage decrease together. Accordingly, when a high limit tube is used as the horizontal output tube the picture width may be decreased and at the same time the high voltage is decreased so that when the television receiver is used at high line voltage the ratings of the picture tube and the high voltage components are not exceeded.

The invention, both as to its organization and method of operation, together with further objects and advantages thereof, will best be understood by reference to the folowing specification taken in connection with the accompanying drawing, in which.

Figures 1, 2, 3, 4, 5:
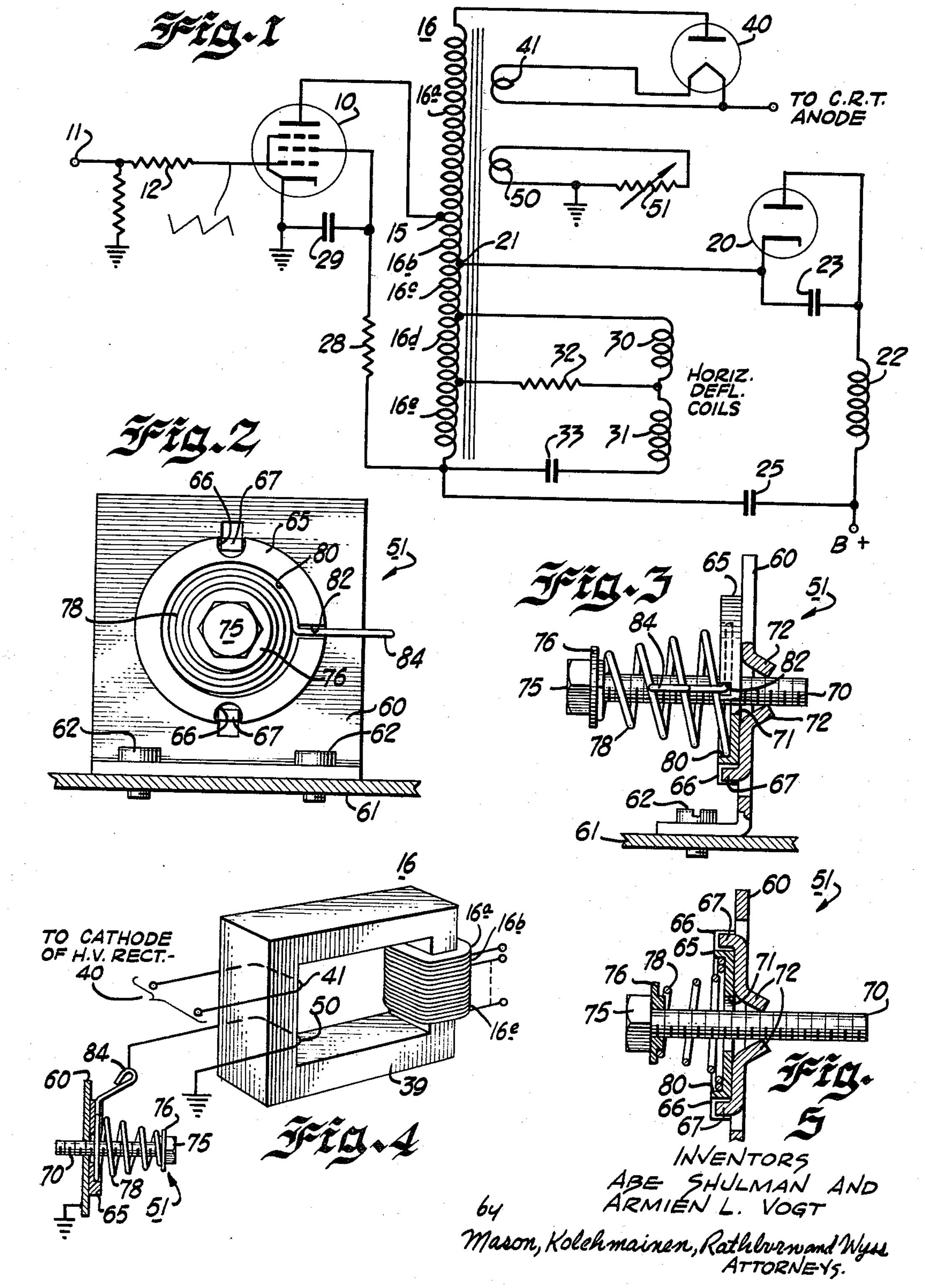
FIG. 1 is a schematic diagram of the combined picture width and high voltage control circuit of the present invention.
FIG. 2 is a front elevation view of a variable resistance device employed in the circuit of FIG. 1.
FIG. 3 is a right side view of the device of FIG. 2.
FIG. 4 is a perspective view of the horizontal output transformer and variable resistance device employed in the circuit of FIG. 1.
FIG. 5 is a view similar to FIG. 3 showing the variable resistance device in a different position.

Referring now to the drawings, and more particularly to FIG. 1 thereof, the control circuit for combined picture width and high voltage control is therein illustrated in conjunction with a horizontal output tube 10 the cathode of which is connected to ground. A suitable sawtooth driving voltage is supplied to the input terminal 11 and is impressed upon the control grid of the output tube 10 through a resistor 12, it being understood that any suitable arrangement may be employed for developing the required sawtooth driving voltage, as will be readily understood by those skilled in the art. The anode of the tube 10 is connected to a tap 15 on a horizontal output transformer indicated generally at 16, the transformer 16 being provided with the winding sections **16*a*, 16*b*, 16*c*, 16*d* and 16*e*, the tap 15 being provided at the junction of the winding sections 16*a* and 16*b***.

In order to increase the supply voltage available for the anode and screen grid of the horizontal output tube 10, a so-called diode damping or efficiency diode arrangement is employed which comprises a horizontal damping rectifier tube 20 the cathode of which is connected to tap 21 on the transformer 16 between the sections **16*b* and 16*c* thereof. The anode of the diode 20 is connected through a choke coil 22 to the conventional supply voltage indicated by the legend B+ in the drawing and a condenser 23 is connected across the diode damper 20. A boost voltage condenser 25 is connected from the B+ terminal to the bottom end of the winding section 16*e* of the transformer 16 so that the diode damper circuit includes the winding sections 16*c*, 16*d* and 16*e* of the transformer 16. The condenser 25 is charged during the portion of each cycle in which the diode 20 is conducting so that a voltage is built up across the condenser 25 which assists the B+ voltage and this boosted B+ voltage is applied to the anode of the horizontal output tube 10 through the windings 16*b*, 16*c*, 16*d* and 16*e* of the transformer. This boost voltage is also applied through a dropping resistor 28 to the screen grid of the tube 10, a filter condenser 29** being connected between this screen grid and ground.

The horizontal deflection coils 30 and 31, which are positioned around the neck of the cathode ray picture tube in a conventional manner, are connected across the winding sections **16*d* and 16*e* of the transformer 16, a resistor 32 being connected between the junction of the winding sections 16*d* and 16*e* and the junction of the deflection coils 30 and 31 and a condenser 33 being connected between the bottom end of the winding section 16*e* and the bottom end of the deflection coil 31. The winding sections 16*d* and 16*e* are so chosen as to properly match the horizontal transformer to the deflection coils 30 and 31, as will be readily understood by those skilled in the art. In this connection it will be understood that the various winding sections of the transformer 16**, which in the illustrated embodiment is shown as an autotransformer, may comprise separate windings which are inductively coupled together through the common core, as will be readily understood by those skilled in the art.

In order to provide a suitable high voltage for the accelerating anode of the cathode ray picture tube, the winding section **16*a* is provided on the transformer 16, the upper end of this winding being connected to the anode of a high voltage rectifier tube 40. The tube 40 is provided with a directly heated cathode which is energized from a single turn coil 41 positioned on one leg of the core 39 of the horizontal output transformer 16, the directly heated cathode of the tube 40 being connected across the winding 41. The rectifier 40 functions to rectify the large amplitude voltage transient produced across the winding 16*a* during the horizontal retrace intervals so that a suitable high voltage is produced at the cathode of the rectifier tube 40** which is supplied to the accelerating anode of the picture tube, as will be readily understood by those skilled in the art.

Considering now the combined picture width and high voltage control circuit of the present invention, and referring additionally to FIGS. 2 to 5, inclusive, there is provided a separate winding on the core 39 of the horizontal output transformer 16 which is employed to produce a resistive loading effect on all of the winding sections of the transformer 16 described in detail heretofore. Specifically, a separate winding 50, which may be in the form of a single turn of insulated wire which is looped around the core 39 of the transformer 16, is provided across which is connected a variable resistance device 51. The variable resistance device is constructed in a particular manner to be described in more detail hereinafter and provides an extremely low but variable resistance which may be adjusted in magnitude from a value of approximately 0.2 ohm to 5.0 ohms. As the resistance of the variable resistance device 51 is varied, a variable shorted turn effect is produced and due to the fact that the winding 50 is inductively coupled to all of the other windings of the transformer 16 a variable resistive loading effect is produced across all of these windings which is proportional to the setting of the variable resistance device 51. If the variable resistance device 51 has a setting of 5.0 ohms, for example, there is very little short circuiting effect produced across the winding 50 and very little resistive loading effect is produced across the horizontal deflection coils and the high voltage windings **16*a*. However, as the resistance of the variable resistance device 51 is decreased an increasing resistive loading effect is produced across the horizontal deflection coils with the result that the maximum current flowing in these coils is reduced and the width of the picture produced on the picture tube is correspondingly decreased. However, it should be noted that since the resistive loading effect produced by the winding 50 affects all of the winding sections of the transformer 16 equally, there is no change in the turns ratio between winding sections with the result that the drive requirements of the horizontal output tube 10** are not changed although the width of the picture has been decreased.

When the maximum current flowing in the deflection coils is decreased by adjustment of the device 51 the amplitude of the inductive transient pulse produced across the tertiary winding **16*a* is also reduced so that the high voltage supplied to the picture tube anode is decreased in a proportionate manner. When the high voltage is also decreased the electron beam is accelerated by a smaller amount and is more easily deflected so that a larger horizontal deflection is produced. However, this increase in horizontal deflection is not sufficient to nullify the decrease in deflection current produced in the horizontal deflection coils 30 and 31 by the above described resistive loading effect with the overall result that the width of the television picture decreases. If the turns ratios between the windings of the transformer 16 were varied, as for example when a potentiometer is connected directly across the winding sections 16d and 16e of the transformer 16 so as to provide picture width changes, then the high voltage changes by a relatively greater amount and tends to nullify the desired change in picture width. Also, when the turns ratio of the transformer is changed by employing such a potentiometer directly across the secondary winding of the transformer the drive requirements are varied which necessitates a readjustment of the drive waveform supplied to the control grid of the tube 10. Furthermore, when a variable inductance device is employed as a picture width control to vary the maximum deflection coil current, the amount of power drawn by the horizontal output tube varies and this tube may actually draw more power as the picture width is decreased. However, in accordance with the present invention these disadvantages are completely obviated by resistively loading the separate single turn coil 50 which is inductively coupled to all of the windings of the transformer 16** and provides a proportionate loading effect on all of the transformer windings so that the turns ratio between windings does not change and the drive requirements and power drawn by the horizontal output tubes do not change with picture width. Accordingly, there is provided an arrangement whereby the picture width may be decreased while, at the same time, producing a proportionate change in the high voltage.

The above described reduction in the high voltage which accompanies the change in picture width has the additional advantage that a permissible change in picture width may be achieved while employing both high limit and low limit tubes as the horizontal output tube 10. In this connection it will be understood that horizontal output tubes are manufactured according to certain manufacturer's ratings which give a predetermined range of current ratings for each commercial type tube. The tubes having the lowest permissible current rating are called low limit tubes and the tubes having the highest permissible current ratings are called high limit tubes. When a low limit horizontal output tube is employed and the receiver is operated at the low limit of line voltage so that the B+ voltage is at its lowest value, it is still necessary to provide television picture having a predetermined minimum width. Thus if it is assumed that low line voltage is applied to the receiver and a low limit tube is employed as the horizontal output tube 10, the transformer 16 should be designed to give a high voltage for the accelerating anode of the cathode ray tube of approximately 16 kv. and should also provide a picture of adequate width, which in most instances is considered to be a picture of sufficient width to fill the aperture in the television receiver viewing screen placed in front of the cathode ray tube.

When normal line voltage is applied to the receiver the high voltage produced for the accelerating anode of the picture tube should be in the order of 18 to 20 kv. so as to provide a picture of acceptable brightness. However, when a high limit tube is employed as a horizontal output tube 10 and high line voltage is applied to the television receiver, the picture width is much too large and the high voltage impressed upon the accelerating anode of the cathode ray tube may be as high as 25 kv. If the picture width is changed without making a corresponding change in high voltage, this 25 kv. accelerating voltage applied to the anode of the cathode ray tube may result in damage to the tube and the high voltage components associated with the rectifier 40. In fact, most picture tubes are not guaranteed for high voltages above 20 kv. Therefore, if a change in picture width is made while the high voltage is held constant either the high voltage rating of the picture tube is exceeded or one must choose particular horizontal output tubes which do not have a high limit rating. This latter alternative is, of course, objectionable, particularly when television receivers are manufactured on a mass production basis wherein it is desirable to use all tubes within the manufacturer's range of current ratings. However, in accordance with the present invention when a high limit tube is employed as a horizontal output tube 10 and high line voltage is applied to the receiver, the picture width may be reduced and is accompanied by a proportionate reduction in the high voltage applied to the accelerating anode so that when the picture width is reduced to a value which just fills the television screen the high voltage is also reduced to a value of approximately 20 kv. so that the manufacturer's rating is not exceeded and the high voltage components are not operated beyond their rated values.

Referring now to FIGS. 2 and 3 of the drawing, there is shown in these figures the physical construction of the variable resistance device 51 whereby a sufficiently low value of resistance which is variable over a relatively wide range of resistance values is produced and may be employed in the manner described above to achieve the combined picture width and high voltage control of the present invention. In this connection, it will be understood that while the device 51 is specifically adapted for use in the illustrated picture width control circuit, the device 51 is, nevertheless, of general application and may be employed in many types of circuits where a low resistance, high current control device is required. Specifically, the resistance device 51 is mounted on a right angle bracket 60 which is secured to the chasis 61 of the television receiver by means of suitable screws 62 or the like. A flat washer 65 of carbonaceous material is positioned with one side of the washer 65 against the bracket 60. Preferably, the washer 65 is a molded, resistive type carbon element and is provided with a pair of opposed notches 66 which are adapted to receive lug portions 67 which are struck up out of the bracket 60, the lugs 67 functioning to prevent the washer 65 from turning an adjustable screw 70 is supported transversely of the bracket 60 at the center of the washer 65, the washer 65 being provided with a relatively large clearance opening 71 at the center thereof so that the screw 70 does not make contact with the washer 65. The screw 70 is preferably retained by suitable means such as the ears 72 which are struck out of the bracket 60 and function as a retaining means to hold the screw 70 in adjusted position.

The screw 70 is provided with a head portion 75 against which there is positioned a bushing 76 of insulating material which is adapted to receive the upper end of a conically shaped coiled spring 78. The large end of the spring 78 is seated in a recess 80 provided in the carbon washer 65 and the washer 65 is provided with a transverse slot 82 on the side opposite the bracket 60 which is adapted to receive the end portion 84 of the spring 78 so that the spring is prevented from turning as the screw 70 is rotated. The end portion 84 of the spring 78 serves as a terminal to which one end of the single turn coil 50 is connected. Thus, referring to FIG. 4, one end of the single turn coil 50 is connected to the chassis, i.e., ground, and the other end of this coil is connected to the terminal portion 84 of the coil spring 78. It will be noted that one side of the washer 65 is connected to ground, i.e., the chassis 61 through the bracket 60. Furthermore, the large end of the coil spring 68 engages the opposite side of the washer 65 in the portion within the recess 80. As the screw 70 is rotated so as to compress the coil spring 78 the spring 78 is flattened against the recessed portion 80 of the washer 65 so that an increasingly larger length of the coil spring 78 engages this side of the washer.

The washer 65 is of carbonaceous material the resistance of which varies with the area of contact established with the ungrounded side of the washer 65. Accordingly, as a greater length of the spring 78 engages the ungrounded side of the washer 65 the resistance of the washer 65 correspondingly decreases. This resistance is connected to ground through the bracket 60 and since one side of the coil 50 is also connected to ground the variable resistance of the washer 65 is effectively shunted across the single turn winding 50. Accordingly, the above described resistive loading effect is achieved in a simple and reliable manner by means of the variable resistance device 51.

When the screw 70 is rotated so that a larger portion of the coil spring 78 is substantially flat against the washer 65, as shown in FIG. 5, a relatively large area contact is established between the terminal 80 and the ungrounded side of the washer 65. When the spring 78 is substantially completely compressed a relatively small resistance in the order of 0.1 to 0.2 ohm is shunted across the winding 50. On the other hand, when the coil spring 78 is fully expanded as in the position shown in FIGS. 2 and 3, only a portion of the end turn of the coil spring 78 contacts the ungrounded side of the washer 65 so that a relatively high resistance in the order of 4 to 6 ohms is shunted across the winding 50. This large range of resistance variation has been found suitable to produce a change in picture width of several inches while at the same time providing a proportional change in the high voltage developed for the accelerating anode of the picture tube. Also, due to the fact that the screw 70 must be rotated through a large number of turns to completely compress the spring 78, a very fine adjustment of the resistance of the device 61 is provided. This is in contradistinction to the very small range of adjustment in carbon pile type devices wherein a number of carbon blocks are compressed so that the resistance of the pile varies with the pressure applied thereto. In the arrangement of the present invention the primary factor affecting the change in resistance is the change in contact area produced by compressing the coil spring 78 against the ungrounded side of the washer 65. In this connection it will be understood that the coiled spring 78 is not made of high resistance wire but instead is a wire of good current conductivity and merely acts as a variable area contact for the washer 65.

It will also be noted that the washer 65 is held against the metal bracket 60 so that good heat conductivity is established to the washer 65 and a relatively high wattage dissipation can be accommodated by means of the device 51. Such high wattage dissipation is necessary because currents of several amperes will flow in the picture width control circuit and the device 51 will be called upon to dissipate as much as 5 or 6 watts when adjusted to its minimum resistance value. It is this high wattage dissipation, together with the extremely low resistance requirement which precludes the use of conventional wire wound potentiometers, or the like. In this connection it will be noted that the screw 70 is employed merely to compress the coil spring 78 and no electrical connection is established to the small end of the coil spring 78, this end being seated on the insulated bushing 76. Accordingly, the screw 70 is employed merely to control the length of the coil spring 78 which is compressed against the ungrounded side of the washer 65 and since the resistance of the washer 65 is dependent upon the contact area established thereto, the resistance of the device 51 is controlled by adjustment of the position of the screw 70, the screw being held in its adjusted position by means of the ears 72. In this connection it will be understood that any other suitable means for holding the screw 70 in adjusted position may be employed, as will be readily understood by those skilled in the art. It will also be noted that the variable resistance device 51 is completely safe for operating personnel who may adjust the screw 70 due to the fact that the device 51 is connected to ground and is of very low resistance. In arrangements employing a potentiometer across a portion of the secondary winding precautions must be taken to minimize shock hazards and insulated shafts or the like must be employed since the potentiometer is ungrounded and has high amplitudes pulses impressed upon it.

While there has been illustrated and described what is at present considered to be the preferred embodiment of the present invention, it will be apparent that various changes and modifications thereof will occur to those skilled in the art.

It is intended in the appended claims to cover all such changes and modifications as fall within the true spirit and scope of the present invention.

What is claimed as new and desired to be secured by Letters Patent of the United States is:

1. In a television receiver, the combination comprising a horizontal deflection output tube, a cathode ray tube high voltage rectifier circuit, a horizontal scanning coil, a coupling transformer, means connecting said output tube to supply cyclically varying current to said scanning coil through at least one winding section of said coupling transformer, means connecting another winding section of said coupling transformer to said high voltage rectifier circuit so that a unidirectional potential is developed thereby of suitable amplitude to energize a cathode ray tube anode, all of said winding sections of said coupling transformer being magnetically coupled together through the core of said transformer, an insulated conductor extending around the core of said transformer to form a single turn coil, and a variable resistance device connected across said single turn coil, said variable resistance device having a sufficiently low resistance value to produce a substantial resistive loading effect on all of the winding sections of said coupling transformer so that the amplitude of said cyclically varying current and the amplitude of said unidirectional voltage may both be varied in a proportion manner by variation of said variation of said variable resistance device.

2. The combination as set forth in claim 1 wherein said variable resistance device has a nominal minimum resistance value of a fraction of one ohm.

3. In a television receiver, the combination comprising a horizontal deflection output tube, a cathode ray tube high voltage rectifier circuit, a horizontal scanning coil, a coupling transformer, means connecting said output tube to supply cyclically varying current to said scanning coil through at least one winding section of said coupling transformer, means connecting another winding section of said coupling transformer to said high voltage rectifier circuit so that a unidirectional potential is developed thereby of suitable amplitude to energize a cathode ray tube anode, all of said winding sections of said coupling transformer being magnetically coupled together through the core of said transformer, an insulated conductor extending around the core of said transformer to form a single turn coil, and a variable resistance device connected across said single turn coil, said variable resistance device comprising a body of carbonaceous material and means including a conically shaped coiled spring for establishing a variable area contact to said body, said body of carbonaceous material having a minimum resistance in the order of a fraction of an ohm which is variable in accordance with the area of said variable area contact so that a substantial resistive loading effect is produced thereby on all of the winding sections of said transformer, whereby the amplitude of said cyclically varying current and the amplitude of said unidirectional voltage may both be varied in a proportional manner by variation of the area of said variable contact.

4. A variable resistance device, comprising a flat body of carbonaceous material, a metallic plate, means for positioning said body on said plate with one side thereof in intimate heat transmitting contact therewith, a spring one end of which is positioned in contact with the other side of said body, said spring consising of a wire of good electrical conductivity which is so formed that an increasing length of said wire is moved into contact with the other side of said body as said spring is compressed, means for establishing electrical contact to said other side of said body through said one end of said spring, and means for compressing said spring, thereby to vary the resistance between said electrical contact and said plate.

5. A variable resistance device, comprising a flat body of carbonaceous material, a metallic plate, means for positioning said body on said plate with one side thereof in intimate heat transmitting contact therewith, said body having an annular peripheral shoulder on the other side thereof and a groove extending through said shoulder, an adjustment screw rotatably supported on said plate and having a head portion spaced from said other side of said body, a coiled spring having one end positioned on said other side of said body within said shoulder and extending through said groove to form an electrical contact to said other side of said body through said one end of said spring, said spring having the other end thereof positioned by said head portion so that as said screw is turned the coils of said spring are compressed against said other side of said body, and means for insulating said head portion from said other end of said spring so that said body of carbonaceous material is not short circuited to said metallic plate.

6. A variable resistance device, comprising a flat body of carbonaceous material, a metallic plate, means for positioning said body on said plate with one side thereof in intimate heat transmitting contact therewith, said body having an opening in the center thereof and an annular peripheral shoulder on the other side thereof with a groove extending through said shoulder, an adjustment screw rotatably supported on said plate and having a head portion spaced from said other side of said body, said screw extending through said opening in said body without contacting the same, a coiled spring the turns of which lie in a generally conical surface having one end positioned on said other side of said body within said shoulder and extending through said groove to form an electrical contact to said other side of said body through said one end of said spring, said spring having the other end thereof positioned by said head portion so that as said screw is turned the coils of said spring are compressed against said other side of said body, means for insulating said head portion from said other end of said spring so that said body of carbonaceous material is not short circuited to said metallic plate, and interlocking locating means on said plate and said body for preventing said body from rotating and for positioning said electrical contact end portion of said spring in predetermined relation to said plate.

7. In a television receiver, the combination comprising a horizontal deflection output tube, a cathode ray tube high voltage rectifier circuit, a horizontal scanning coil, a coupling transformer, means connecting said output tube to supply cyclically varying current to said scanning coil through at least one winding section of said coupling transformer, means connecting another winding section of said coupling transformer to said high voltage rectifier circuit so that a unidirectional potential is developed thereby of suitable amplitude to energize a cathode ray tube anode, all of said winding sections of said coupling transformer being magnetically coupled together through the core of said transformer, a separate winding on said coupling transformer, and a variable resistance device connected across said separate winding, said variable resistance device having a sufficiently low resistance value to produce a substantial resistive loading effect on all of the winding sections of said coupling transformer so that the amplitude of said cyclically varying current and the amplitude of said unidirectional voltage may both be varied in a proportional manner by variation of said variable resistance device.

References Cited in the file of this patent

UNITED STATES PATENTS

| | | |
|---|---|---|
| 2,523,108 | Friend | Sept. 19, 1950 |
| 2,554,925 | Schlesinger | May 29, 1951 |
| 2,782,363 | Briggs | Feb. 19, 1957 |

FOREIGN PATENTS

| | | |
|---|---|---|
| 265,676 | Great Britain | Nov. 9, 1925 |

UNITED STATES PATENT OFFICE

CERTIFICATE OF CORRECTION

Patent No. 3,134,045 May 19, 1964

Abe Shulman et al.

It is hereby certified that error appears in the above numbered patent requiring correction and that the said Letters Patent should read as corrected below.

Column 8, line 43, for "proportion" read -- proportional --; same line 43, strike out "variation of said".

Signed and sealed this 15th day of September 1964.

SEAL)
Attest:

ERNEST W. SWIDER
Attesting Officer

EDWARD J. BRENNER
Commissioner of Patents